United States Patent [19]

Dalton

[11] Patent Number: 5,485,550

[45] Date of Patent: Jan. 16, 1996

[54] METHOD AND APPARATUS FOR FUZZY LOGIC RULE EXECUTION

[75] Inventor: John C. Dalton, San Francisco, Calif.

[73] Assignee: Apple Computer, Inc., Cupertino, Calif.

[21] Appl. No.: 370,521

[22] Filed: Jan. 17, 1995

Related U.S. Application Data

[63] Continuation of Ser. No. 95,987, Jul. 23, 1993, abandoned.

[51] Int. Cl.$^6$ ......................................................... G06F 9/44
[52] U.S. Cl. ................................. 395/51; 395/3; 395/61; 395/76
[58] Field of Search .................................. 395/3, 51, 76, 395/61

[56] References Cited

U.S. PATENT DOCUMENTS

| | | | |
|---|---|---|---|
| 4,912,648 | 3/1990 | Tyler | 395/61 |
| 4,916,225 | 10/1990 | Hisano | 544/276 |
| 5,040,133 | 8/1991 | Feintuch et al. | 364/581 |
| 5,123,057 | 6/1992 | Verly et al. | 382/37 |

OTHER PUBLICATIONS

A Formal Approach for the Organization and Implementation of Fuzzy Micro–Processor Module. Labib Sultan, Dec. 31, 1988.
Single Board System for Fuzzy Inference James R. Symon, Hiroyuki Watanabe, Feb. 28, 1991.
A Fuzzy Logic Programming Environment for Real Time Control Stephen Chiu, Masaki Togai Dec. 31, 1988.
Optimization of Fuzzy Logic Inference Architecture Chiciah, IEEE/May 1992.
Architecture of a CMOS Fuzzy Logic Controller with Optimized Memory Organization and Operator Design Eichfeld et al. IEEE/Aug. 1992.
Optimization of Fuzzy Logic Implementation Chiueh IEEE/ 1991.
Togai InfraLogic, Inc., "Fuzzy Logic: From Software to Silicon–A Primer", pp. 1–35, Aug. 1992, Irvine, Calif.
VLSI Technology, Inc., "VY86C500 12–Bit Fuzzy Computational Acceleration Core", pp. 1–25, Jan. 1993, San Jose, Calif.
B. Kosko and S. Isaka, "Fuzzy Logic", *Scientific American*, pp. 76–81, Jul. 1993, published in the U.S.
M. Togai and H. Watanabe, "Expert System on a Chip: An Engine for Real–Time Approximate Reasoning," IEEE Expert vol. 1, No. 3, pp. 55–62, Fall 1986, published in the U.S.

(List continued on next page.)

*Primary Examiner*—Allen R. MacDonald
*Assistant Examiner*—Richemond Dorvil
*Attorney, Agent, or Firm*—Burns, Doane, Swecker & Mathis

[57] ABSTRACT

A fuzzy logic system for processing a vector of signals includes a rule partition table stored in an electronic memory, a rule identifier, and a rule processor. The rule partition table is organized to include identifiers, each corresponding to a unique combination of partitions of signal values of the vector of signals, and each identifying fuzzy rules which are preselected to be applied to a corresponding vector of signals having signal values within respective ranges of the partitions corresponding to the identifier. Preselection may include only fuzzy rules which produce non-zero outputs when applied to a vector of signals having signal values within respective ranges of the partitions corresponding to the identifier. The rule identifier accesses a location in the rule partition table corresponding to the vector of signals, and retrieves therefrom a corresponding identifier. The rule processor applies each identified fuzzy rule to the vector of signals to produce a processed vector of signals. The rule partition table may be a tree-like linked list having, for each signal of the vector of signals, a corresponding level, each level having, for each partition of signal values of the corresponding signal, a corresponding node having a first link to a neighboring node on the same level and a second link alternatively to a linked list of nodes on a lower level or to an identifier. The table may alternatively be a multidimensional array.

12 Claims, 5 Drawing Sheets

OTHER PUBLICATIONS

H. Watanabe et al., "VLSI fuzzy chip and inference accelerator board systems," *Fuzzy Logic For The Management Of Uncertainty*, edited by L. Zadeh and J. Kacpryzyk, Wiley, 1992.

Tzi–cher, Chiueh, "Optimization of Fuzzy Logic Inference Architecture", *Computer* vol. 25, No. 5, pp. 67–71, May 1992, Long Beach, U.S.

H. Eichfeld et al. "Architecture of a CMOS Fuzzy Logic Controller with optimized memory organization and operator design", *Proceedings of the IEEE International Conference on* Fuzzy Systems, pp. 1317–1323, Mar. 8–12, 1992, San Diego, Calif., USA, 1992.

P. Bonissone and Kenneth Chiang, "Fuzzy Logic Controllers: from Development to Deployment", *Proceedings of the 1993 IEEE International Conference on Neural Networks*, vol. II, pp. 610–619, San Francisco, Calif., USA 1993.

I. Turksen et al. "Hierarchical scheduling based on approximate reasoning–A comparison with ISIS", Fuzzy SEts and Systems, vol. 46, No. 3, pp. 349–371, Amsterdam, NE 1992.

Patent Abstracts of Japan, vol. 16, No., 186 (P–1347) 7 May 1992 & JP., A, 04 023 130 (Yaskawa Electric) 27 Jan. 1992.

METHOD AND APPARATUS FOR FUZZY LOGIC RULE EXECUTION

This application is a continuation of application Ser. No. 08/095,987, filed Jul. 23, 1993, now abandoned.

BACKGROUND

The present invention relates to a fuzzy logic system and method for applying fuzzy logic rules to a vector of signals, and more particularly, to a fuzzy logic system and method which uses the vector of signals to access a location in a rule partition table containing a list of only those rules which will produce non-zero outputs when applied to the particular vector of signals.

Logic systems have traditionally relied on the use of Boolean algebra. Boolean algebra uses variables which may take on either of the values TRUE and FALSE. These variables, when used in conjunction with Boolean operators, such as AND, OR, and NOT, form expressions which also take on either of the values TRUE and FALSE.

One application for Boolean algebra is in the design of expert systems. Such systems may be used to make real-time decisions for controlling a particular machine, or they may be tailored to simply provide answers, based on information stored in a knowledge base, to questions posed by a user. Determining these answers usually requires the expert system to make deductions and inferences from the information provided by the user before an appropriate answer can be retrieved from the knowledge base.

Boolean-based expert systems are typically composed of a collection of production rules that take the form "IF x, THEN y" (where the variable x may represent a boolean expression, such as x=a OR b). These systems tend to be very rigid due to the inherent on-off quality associated with their binary logic variables and rules. They do not deal well with concepts for which precise definitions are not available, such as whether something is "warm," "tall" or "bright." Furthermore, these systems also have trouble operating under conditions in which conflicting rules may be activated simultaneously.

To avoid these deficiencies, some expert systems use production rules in which boolean logic expressions are replaced by fuzzy logic expressions. Multi-valued logic systems were first proposed by the polish logician Jan Lukasiewicz in the 1920's. Fuzzy systems were later popularized by Lotfi Zadeh in the 1960's, who developed the concept of fuzzy set theory. Fuzzy logic variables make up for the imprecision associated with the traditional "on/off" characteristic of Boolean variables by representing each variable as a proportion of membership in related fuzzy sets (called membership elements). Therefore, it is possible for a variable with a given value to be a partial member of two or more fuzzy category labels at the same time (i.e. a room's temperature could be both hot and warm at the same time). This flexibility allows the fuzzy system to better model the ambiguity inherent in real world problems.

Fuzzy logic is now in use in embedded controllers in a number of commercial products, mainly from Japan. These fuzzy controllers have been described as easier and faster to design, and require less code than conventional methods. Fuzzy logic can be used to construct a fuzzy logic controller, or an expert system that can deal with uncertain reasoning, thus providing a significant advantage over conventional Artificial Intelligence (AI) techniques.

In addition, there is a direct relationship between fuzzy logic systems and feed foreword neural nets. This implies that a trained neural net can be represented as a fuzzy logic system, and vice versa. A fuzzy logic system could be used as an alternate implementation of a neural net trained for some specific task.

The flexibility of fuzzy systems is illustrated by the following example, in which each input and output variable to the fuzzy logic system is called a category, and in which each category is composed of a series of fuzzy identifiers called membership elements.

Referring now to FIG. 1, a fuzzy input category representing room temperature is shown. A fuzzy input category such as this may be used, for example, in a fuzzy heating controller. In this example, one input variable may be a measure of room temperature, in degrees Fahrenheit. The fuzzy membership elements associated with room temperature are defined to be the following:

VL=very low, L=low, M=medium, H=high, VH=very high.

The diagram in FIG. 1 shows the five fuzzy membership elements and their associated overlapping membership envelopes. The horizontal axis of the graph represents the category input value, which in this example is room temperature. The vertical axis represents the proportion of membership of a given input value in a particular membership element. Each membership element has an associated membership envelope which defines the proportion of membership in the membership element over the range of input values of the category. Before a fuzzy system can perform its processing with any category input value, that input value must be converted to a set of proportions of membership in corresponding membership elements. These will be referred to here as "fuzzy variables."

As can be seen from the figure, a particular category input value can be a member of more then one element, usually with different proportions for each membership element. For example, FIG. 1 illustrates a situation in which a room temperature category value of 70 degrees is a 60% member of the medium fuzzy membership element and a 40% member of the high fuzzy membership element.

It is important not to confuse proportions of membership with probabilities. A probability is a measure of how likely it is that something will occur. In contrast, fuzzy proportion of membership measures the extent to which something occurs. For example, the weather forecast statement "There will be a 60% chance of sun" provides information about the likelihood of having a clear day. By comparison, the fuzzy statement "There is 60% sun today" is a measure of how much the sun is shining, not whether it will shine. Note that in this case, it may simultaneously be true that it is 40% cloudy. Boolean-based systems, by contrast, might have trouble dealing with the variables "sunny" and "cloudy" both being true at the same time.

Just as standard expert systems typically comprise a collection of boolean algebra-based production rules, expert systems based on fuzzy logic utilize a set of fuzzy logic rules. Fuzzy logic rules take the same form as standard Boolean logic rules (i.e., "IF x THEN y"), but they use fuzzy set theory rather then binary logic. Fuzzy logical Intersection (X AND Y) is typically defined as the minimum of x and y, expressed as Min(x,y). Fuzzy logical Union (X OR Y) is typically defined as the maximum of x and y, expressed as Max(x,y). Fuzzy logical Negation of X is typically computed as (1-X). These definitions are the ones originally proposed by Zadeh. Alternative definitions also exist, and would be equally applicable in this discussion.

A conventional fuzzy system, then, functions by first converting "real world" input variables (such as "temperature=68°") into fuzzy input variables (such as "temperature= 70% warm, 30% cool, 0% cold, . . . "), and then applying each rule in the rule base to the fuzzy input variables to produce the fuzzy output variables (such as "fan speed=76% fast, 24% medium, 0% slow, . . . ") defined by the rule base. Finally, the fuzzy output variables, which are in the form of membership curves, must usually be converted back into a single numerical value (such as "fan speed=550 revolutions per minute") so that useful control signals can be generated. This "defuzzification" is commonly performed by the "centroid method." In this well known technique, the numerical output value is set equal to the computed center of mass, or centroid, of the area under the curve. Other defuzzification techniques are also available, but not as commonly used. Fuzzy input variables, fuzzy rules, and conversion of fuzzy variables into single numerical values are discussed in B. Kosko and S. Isaka, "Fuzzy Logic," *SCIENTIFIC AMERICAN*, pp 76–81, July 1993, which is hereby incorporated by reference.

A completely specified fuzzy rule system has, for each fuzzy output variable, a rule for each potential combination of input membership elements. As an example, consider a system that is composed of a number of input categories and one output category. For this example, suppose that each category (both input and output) has five fuzzy membership elements associated with it, as illustrated in FIG. 1.

If the fuzzy system has two input categories and one output category, then 5×5=25 rules are required for complete specification. Three input categories require 5×5×5=125 rules for complete specification. Five input categories require 5×5×5×5×5=3125 rules for complete specification. Thus, the number of fuzzy rules necessary to completely specify operation of the system grows exponentially as the number of system variables increases.

It is obvious that as the number of required input categories increases, the execution time associated with individual rules quickly becomes the dominant factor in the overall fuzzy system execution cycle.

One proposed solution to this problem is the construction of special purpose Very Large Scale Integrated Circuits (VLSI) fuzzy logic processors having hardware that is specially tailored for performing fuzzy computations at high speed. For example, VLSI Technology, Inc., of San Jose, Calif. manufactures the VY86C500, which is a 12-bit fuzzy computational acceleration core. Computational engines such as these allow thousands of fuzzy rules to be executed per second. However, it is desirable to find solutions which don't rely on brute-force computational power, so that fuzzy logic toolbox functionality can be implemented on conventional personal computer architectures.

SUMMARY

It is therefore an object of the present invention to provide a fuzzy logic system and method for quickly applying fuzzy logic rules to a vector of signals to produce an output.

In accordance with one aspect of the present invention, the foregoing and other objects are achieved in a fuzzy logic system for processing a vector of signals, comprising input means for inputting the vector of signals, an electronic memory, rule identifier means, and rule processing means. The electronic memory has stored therein a rule partition table. The rule identifier means is coupled to the input means and the electronic memory, and uses the vector of signals to access a corresponding location in the rule partition table, and to retrieve therefrom an identifier of fuzzy rules which are preselected to be applied to the corresponding vector of signals. The rule processing means is coupled to the input means and to the rule identifier means, for applying each of the identified fuzzy rules to the vector of signals to produce a processed vector of signals.

In another aspect of the invention, the rule partition table is a tree-like linked list having, for each signal of the vector of signals, a corresponding level. Each level has, for each partition of signal values of the corresponding signal, a corresponding node having a first link to a neighboring node on the same level and a second link alternatively to a linked list of nodes on a lower level or to an identifier of fuzzy rules which are preselected to be applied to the corresponding vector of signals. Each partition is defined to be a range of signal values of a corresponding signal for which predetermined signal category membership envelopes have non-zero values.

In still another aspect of the invention, the rule identifier means uses the vector of signals to traverse the rule partition table to arrive at a base node having a second link to an identifier of fuzzy rules which are preselected to be applied to the corresponding vector of signals.

In yet another aspect of the invention, each identifier of fuzzy rules identifies only fuzzy rules having a non-zero output when applied to the corresponding vector of signals. This ensures that no time is wasted applying rules which will not have any effect on the output of the fuzzy logic system.

In another aspect of the invention, the rule partition table is a multi-dimensional array of identifiers. Each dimension of the multi-dimensional array corresponds to one signal of the vector of signals and each dimension has a number of identifiers corresponding to a number of partitions of the corresponding signal. In this arrangement, each identifier in the multi-dimensional array corresponds to a unique combination of partitions of the vector of signals. Each identifier in the multidimensional array identifies fuzzy rules which are preselected to be applied to a corresponding vector of signals having signal values within respective ranges of the partitions corresponding to the identifier.

In yet another aspect of the invention, the rule identifier means uses the vector of signals to generate an address for accessing a corresponding identifier in the rule partition table.

In a still further aspect of the invention, a method for applying fuzzy logic rules to a vector of signals, comprises the steps of storing a rule partition table in an electronic memory, the rule partition table including identifiers, each identifier corresponding to a unique combination of partitions of respective signal values of the vector of signals, and each identifying fuzzy rules which are preselected to be applied to a corresponding vector of signals having signal values within respective ranges of the partitions corresponding to the identifier, wherein each partition is a range of signal values of a corresponding signal for which predetermined signal category membership envelopes have non-zero values; inputting the vector of signals; using the vector of signals to access a corresponding electronic memory location in the rule partition table, and retrieving therefrom an identifier; and applying each identified fuzzy rule to the vector of signals to produce a processed vector of signals.

BRIEF DESCRIPTION OF THE DRAWINGS

The objects and advantages of the invention will be understood by reading the following detailed description in conjunction with the drawings in which:

FIG. 3 is an illustration of a complete specification rule base of 25 rules associated with a two input, one output fuzzy logic system that has five membership elements associated with each category;

FIG. 4 is an illustration showing why only a subset of an entire fuzzy logic rule base is required to produce an output in a completely specified system;

DETAILED DESCRIPTION

Figure 2:
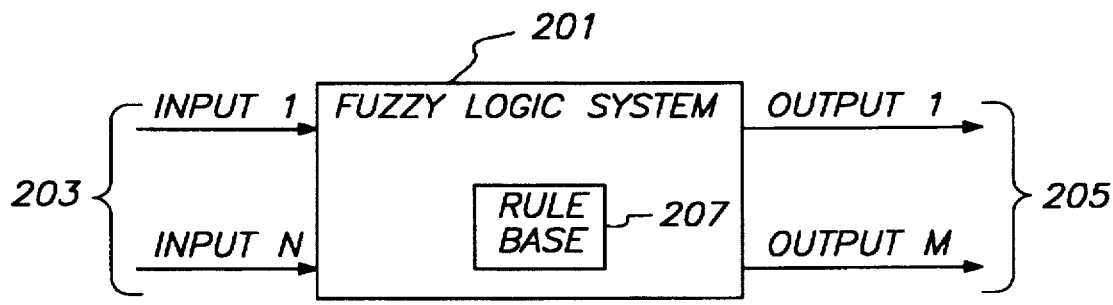
FIG. 2 is a block diagram of a fuzzy logic system, having an input vector and an output vector.

Referring now to FIG. 2, a fuzzy logic system 201 is shown, having an input vector 203 and an output vector 205. The fuzzy logic system 201 includes a rule base 207 which contains a complete set of rules for determining the output vector 205 from any possible input vector 203. However, for any given input vector 203, only a small subset of the total rule base has any influence in computing the output vector 205. This is because each input variable in the input vector 203 will have zero percent membership in many membership elements. Moreover, the size of this subset, measured as a fraction of the complete rule base 207, rapidly decreases as the number of inputs, N, that make up the input vector 303 increases.

Figures 3, 4:
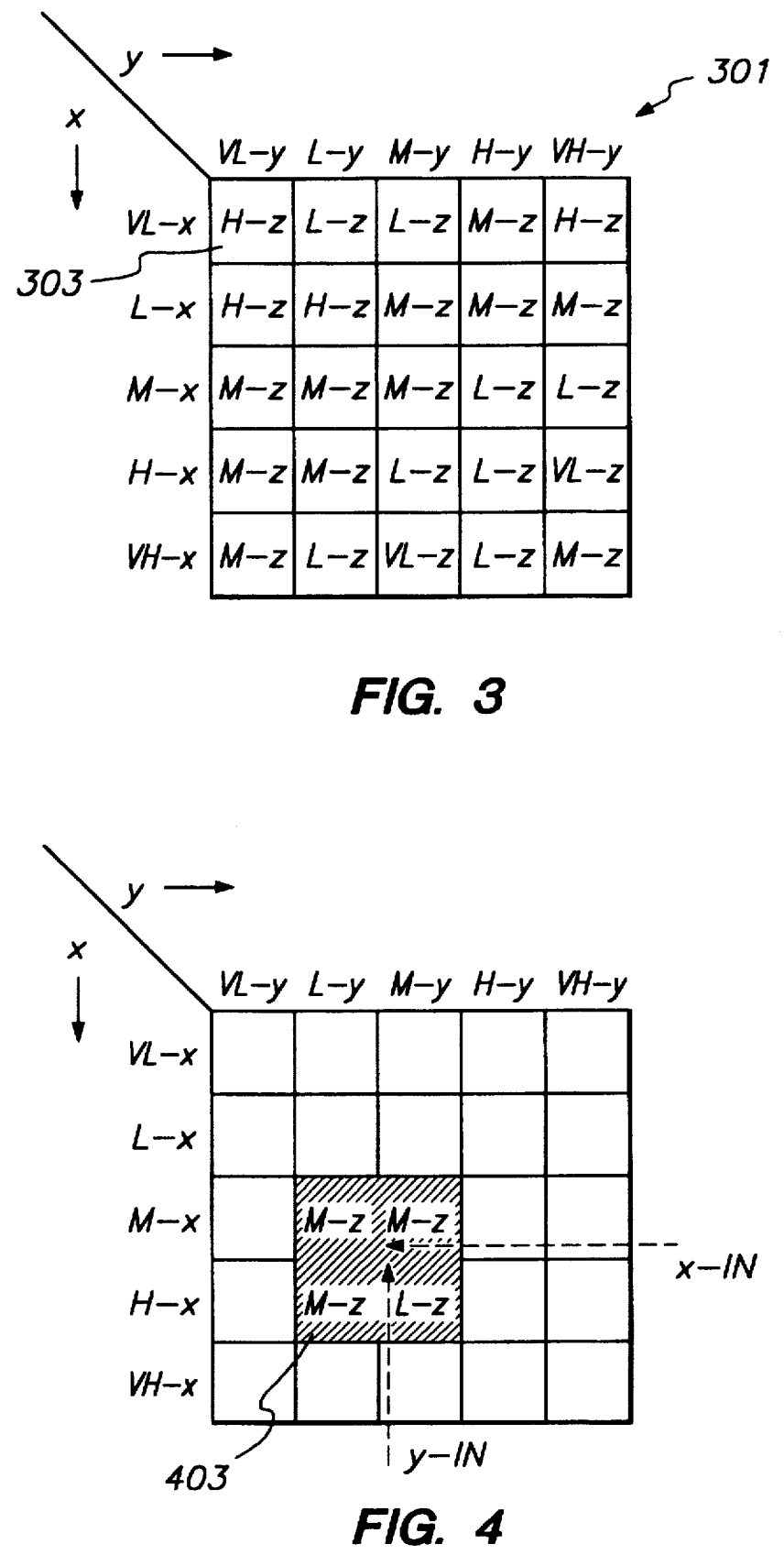

For example, FIG. 3 illustrates a complete specification rule base 301 of 25 rules associated with a two input, one output fuzzy logic system that has five membership elements associated with each category. For this simple example, each of the input and output categories has the associated membership elements and envelopes depicted in FIG. 1. Each box in the rule base 301 represents one rule of the form: IF x IS membership element AND y is membership element THEN z SHOULD_BE membership element. For example, box 303 represents the rule:

IFxIS VL AND y IS VL THEN z SHOULD_BE H

Figure 1:
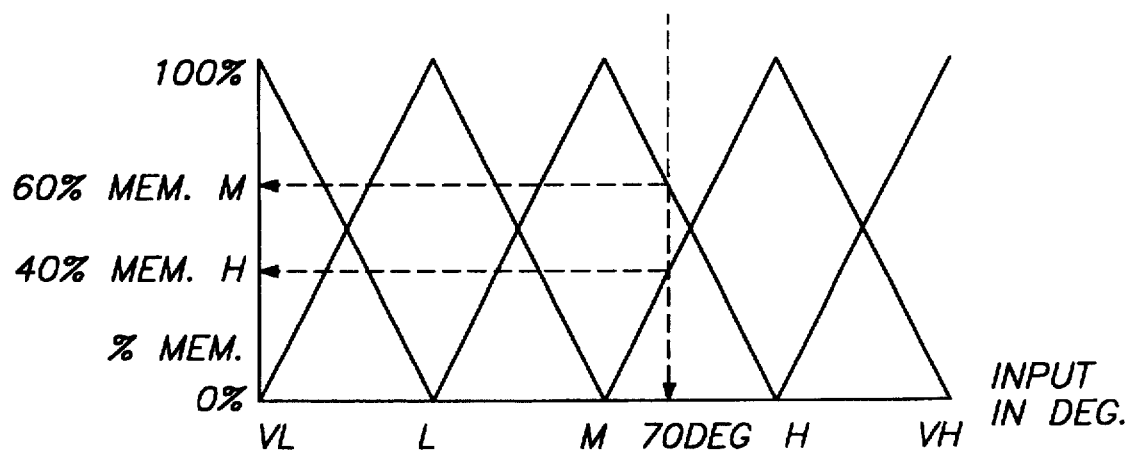
FIG. 1 is a diagram of a fuzzy input category representing room temperature.

Prior art systems apply each and every one of the twenty-five rules in the rule base 301 to the fuzzy input variable in order to generate an output. However, the present invention recognizes, as shown in FIG. 1, that a given input value will activate 2 membership elements in each of the input categories. For example, an x input value of 70 degrees will have non-zero percent membership in both the Medium ((60%) and High (40%) membership elements. Consequently, this input value will have an influence on the output of only those rules which have predicates of "x IS M" or "x IS H". In rule base 301, this corresponds to 10 rules.

Similarly, any input value for the y variable will activate, at most, 10 rules. Because the rule base is constructed entirely with rules of the form "x IS . . . AND y IS . . . ," only four rules will have a non-zero percent membership contribution on the output. This is illustrated in FIG. 4, where the x input activates rules having "x IS M" or "x IS H" as a predicate, and the y input activates rules having "y IS L" or "y IS M" as a predicate. The union of those sets of rules are the four rules 403 which produce non-zero output values for the x and y input values illustrated.

Of course, the above description is merely illustrative. Fuzzy systems having an input vector 203 consisting of more than two input variables will generate outputs which are generated from comparatively fewer rules. For example, a fuzzy system with five inputs requires 3125 rules for complete specification. However, where the form of each of the rules is "IF a IS . . . AND b IS . . . AND c IS . . . AND d IS . . . AND e IS . . . THEN z SHOULD BE . . . ," only 32 rules from the rule base will have any influence on each output.

The present invention takes advantage of this locality of rule activation by means of a strategy in which the rule base is partitioned according to input vector values, and then, for a particular input vector, only the rules associated with that input vector's value are performed, thus eliminating the effort of performing rules which will not affect the output.

Figure 5:
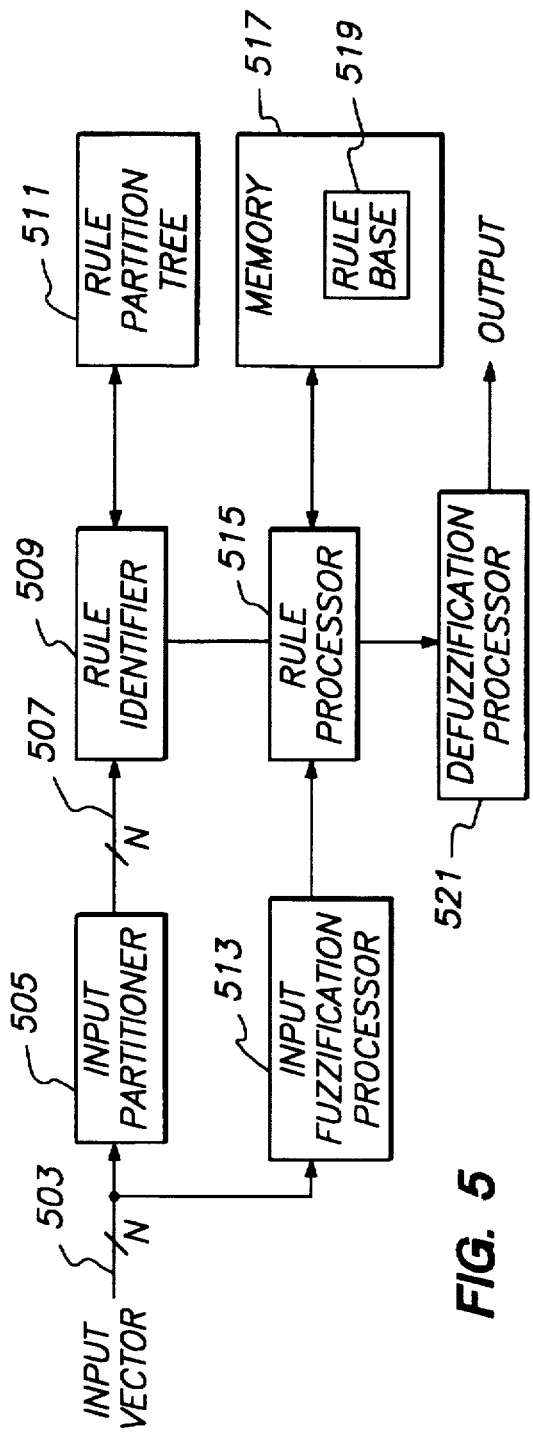
FIG. 5 is a block diagram of a fuzzy logic system built in accordance with the present invention.
Figure 6:
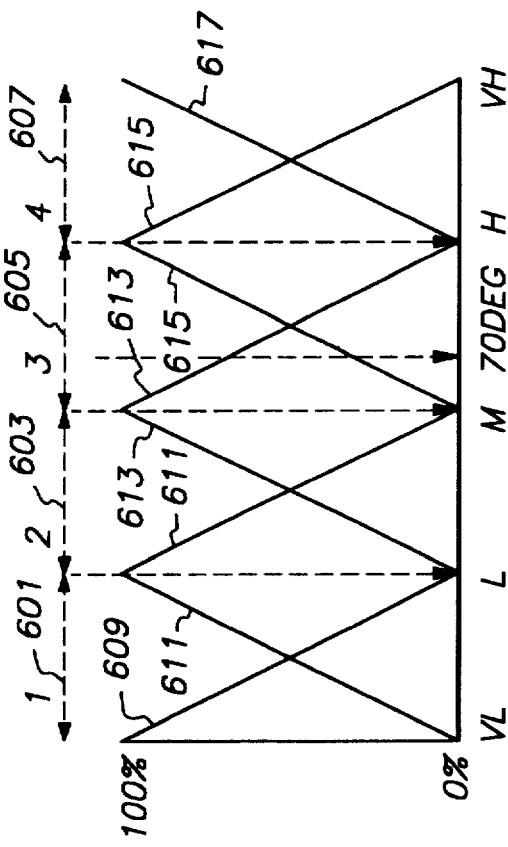
FIG. 6 is an illustration of the partitions associated with a category having the five membership elements previously defined with reference to FIG. 1.

Referring now to FIG. 5, a fuzzy system 501 built in accordance with the present invention is shown. An N element input vector 503 provides non-fuzzy values to an input partitioner 505. The input partitioner 505 associates each of the N input elements of the input vector 503 with a corresponding partition identifier which is then output as the N element partition identifier vector 507. To understand what each partition represents, reference is now made to FIG. 6, which illustrates the partitions associated with a category having the five membership elements previously defined with reference to FIG. 1. A partition is a complete input value range for which there is overlap of two membership element envelopes. A partition identifier is a label which is used to identify a partition. In the example shown in FIG. 6, the first partition 601 corresponds to the complete range of input values for which there is overlap between the Very Low membership envelope 609 and the Low membership envelope 611. Similarly, the second partition 603 corresponds to the complete range of input values for which there is overlap between the Low membership envelope 609 and the Medium membership envelope 613, and so on. After each partition identifier has been generated, the N element partition identifier vector 507 is made available to the rule identifier 509.

The rule identifier uses the partition identifier vector 507 to generate a signal which identifies a subset of rules, from all of the rules stored in the rule base 519, whose execution will accurately generate an output for a given input vector 503. No other rules from the rule base 519 need be executed, because such execution will not contribute to the output. The basis for determining the subset of rules is as follows. It will be recognized that there is a correspondence between each partition identifier and the rule predicates which will have proportions of membership greater than zero and which will, therefore, have an affect on the output of the fuzzy logic system 501. For example, it was previously explained, with reference to FIG. 1, that an input temperature of 70 degrees will have an influence on the output of only those rules which have predicates of "x IS M" or "x IS H". Referring back, now, to FIG. 6, it can be seen that an input value of 70 degrees falls in the third partition 605, which corresponds to the complete range of input values for which there is overlap between the Medium membership envelope 613 and the High membership envelope 615. Thus, for an x input value of 70 degrees, or any x input value falling in the third partition 605, only those rules which have predicates of "x IS M" or "x IS H" need be executed.

A similar analysis may be performed for x input values falling in each of the other partitions. Then each subset of rules associated with partitions of x may be further reduced by performing the same analysis for the next input variable, y, taking the x subset of rules as the starting rule base. The process is continued for every remaining input variable, until a subset of rules is associated with every possible combination of input variable partitions. It should be noted that this process, whereby the analysis of each input variable takes, as its starting rule base, the subset of rules determined from the analysis of a preceding variable works because all of the rules are of the form "IF x IS . . . AND y IS . . . " If this were not the case, then the analysis of each variable would start with the entire rule base to produce a subset for each variable. Then, for each combination of input variable partitions, the corresponding subsets would be combined, with redundant rules being eliminated.

The above analysis to determine rule subsets associated with every combination of input variable partitions is preferably performed during a design phase of the fuzzy system 501, and is stored in an electronic memory for use during runtime processing, at which time the rule identifier 509 uses the partition identifier vector 507 to access a corresponding subset of rule identifiers from the prestored table, and output this to the rule processor 515.

In the case of a fuzzy system with adaptive on-line fuzzy learning, the initial table of rule subsets (also referred to as a "rule partition table") may be adaptively modified on line as well. The need for this may be seen by considering the fuzzy logic system as an approximation of a multidimensional functional mapping device. If the characteristics of that mapping change over time, then the membership envelopes, membership elements and/or fuzzy rules may all adaptively change. These changes may include the shape and/or extent of the membership envelopes, the number of membership elements, and the number of rules and/or the form of the rules. The adaptive system may use adaptive vector quantization, or an algorithm that works like adaptive vector quantization, to determine the characteristics of the functional mapping over time. Alternatively, the system may be responsive to an indication of errors in its output in order to determine whether the desired functional mapping is changing over time, and if so, to adjust the functional mapping to reduce the error. This adjustment would, in turn, necessitate a corresponding adjustment in the table of rule subsets. The adjustment could be derived by using genetic algorithms, which use a form of simulated evolution to optimize a system, and/or by means of gradient descent-like algorithms that would fine tune parameters.

In the preferred embodiment, the table of rule subsets is stored as a rule partition tree 511. Those skilled in the art will recognize that the rule partition tree 511 may be stored in the same electronic memory 517 as the rule base 519, or in a separate memory as shown.

Figure 7:
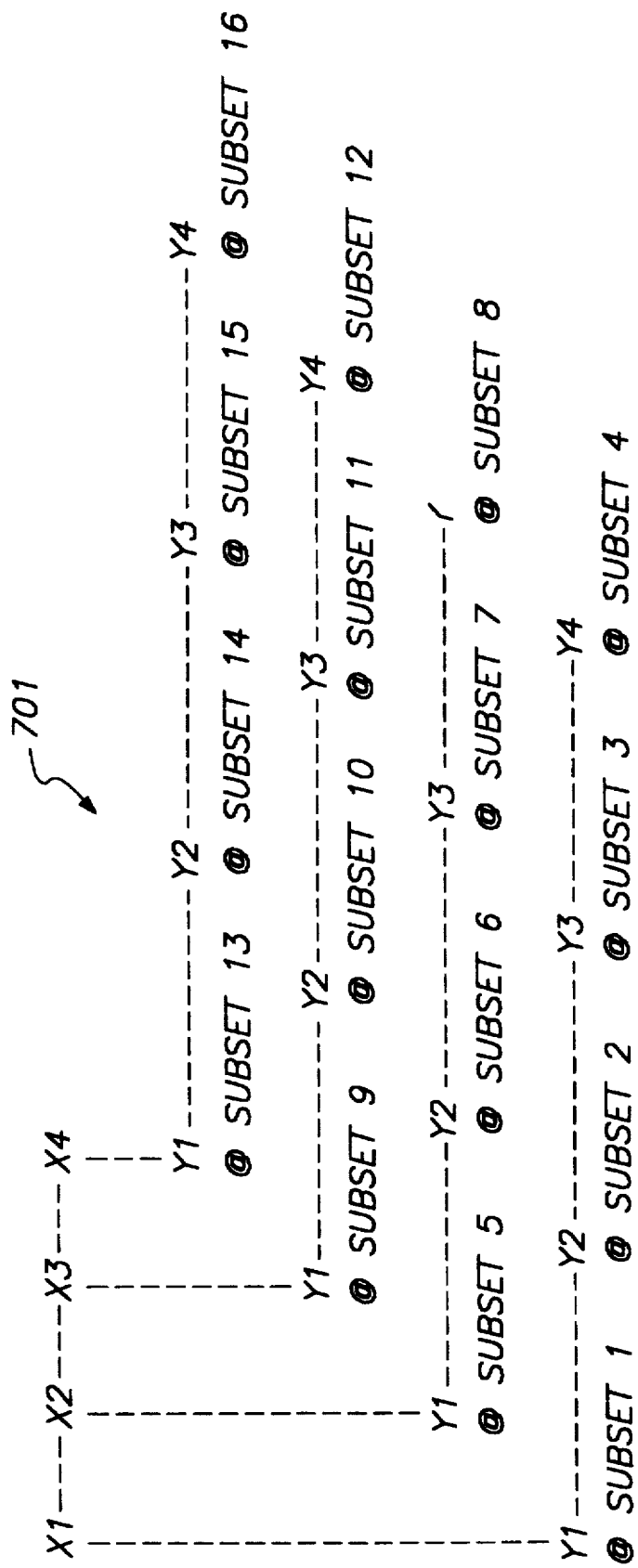
FIG. 7 is a diagram of a rule partition tree for the two input rule base of FIG. 3.

A rule partition tree 701 for the two input rule base 301 of FIG. 3 is shown in more detail in FIG. 7. The rule partition tree 701 is stored in an electronic memory (not shown) in the form of a tree-like linked list. Each node in the rule partition tree 701 contains an identifier which associates that node with a particular partition of a particular input variable, a pointer to neighboring nodes corresponding to different partitions of the same input variable, and a pointer to the list of partitions for the next variable. In this example, partitions of the variable x are shown as X1, X2, X3, and X4. Partitions of the variable y are shown as Y1, Y2, Y3, and Y4. If a node is not at the bottom of the tree, then it contains a pointer to a list of the nodes at the immediately subjacent level of the tree which correspond to the partitions of another variable. The number of levels in the tree corresponds to the number of input variables in the input vector. The base nodes (i.e., those at the bottom of the partition tree) contain pointers to those rules in the rule base 519 which make up the corresponding rule subset for that combination of variable partitions, as determined in accordance with the principles described above. For example, the symbol @subset7 in FIG. 7 represents pointers to the rules in the rule base 519 which make up the subset of rules which should be executed when the input vector 503 contains an x input value which is associated with the second partition (X2) and a y input value which is associated with the third partition (Y3). Those skilled in the art will readily recognize that the rule partition tree 701 can be expanded vertically to accommodate an input vector 503 containing more than two input variables, and horizontally to accommodate categories which contain more than four partitions.

To use the rule partition tree 701, the rule identifier 509 starts at the X1 node, and traverses the horizontal list until the node corresponding to the present x partition is found. Then, the rule identifier 509 uses that node's link to the list of nodes that is one level down from the present node. The process is repeated until there are no more levels of the rule partition tree 701 to traverse. At that point, the rule identifier 509 obtains the pointer to those rules in the rule base 519 which make up the corresponding rule subset for the present combination of variable partitions.

Figure 8:
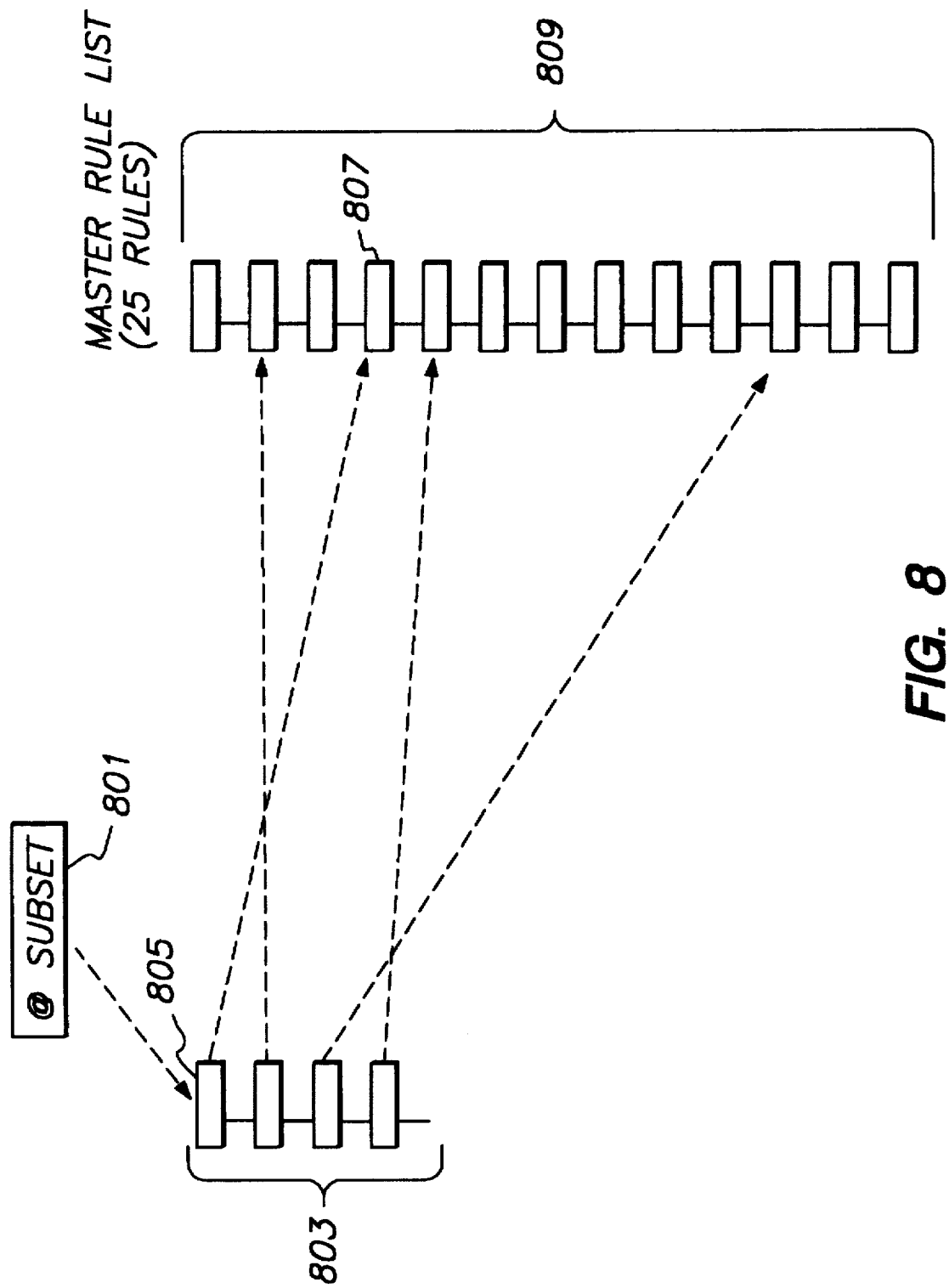
FIG. 8 is a diagram showing an example of how a rule subset pointer located in a rule partition tree base node might be used to access rules organized in an electronic memory.

An example of a subset of rules is shown in FIG. 8. The pointer @subset 801 is a memory address that points to the start of a subset linked list 803. Each node 805 in the subset linked list is a memory address that points to a rule pointer 807 which, itself, is part of a master rule linked list 809. The rule pointer 807 is the memory address of a rule in the rule base 519 stored in the memory 517.

In an alternative embodiment, the input partitioner 505 and the rule identifier 509 are combined into one block which performs both functions. In this case, each of the nodes of the rule partition tree 701 also contains the range of input variable values which define the corresponding partition for that variable. The rule identifier then compares the value of the input variable with the range at each node. If the value of the input variable is within the range, then that node corresponds to the correct partition for the given input variable.

In yet another alternative embodiment, the rule partition tree 511 is not a tree at all, but is a multidimensional array, the number of dimensions corresponding to the number of input variables in the input vector 503. In this instance, the multidimensional array merely contains the pointers to the subsets of rules. Rather than actually traversing the array as in the above example, the job of the rule identifier 509 is to use the given input vector or input partitions to generate an appropriate address for accessing the pointers to the subsets of rules. This approach has several disadvantages, however, when compared to the tree-like linked list described above. First, multidimensional arrays are usually not dynamically allocated variables. Rather, they are defined as a fixed size when a program is compiled. If, for example, an input vector 503 contains five input variables, then a five dimensional array might be defined by a program statement such as: partitionLinkList[a][b][c][d][e], where (a,b,c,d,e) is the input vector. In order to access any address in this array, however, the compiler would have to generate program instructions to perform the following address calculation:

Address=BASEADDRESS+(a*ASIZE)+(b*BSIZE)
+(c*CSIZE)+(d*DSIZE)+(e*ESIZE).

Therefore, five multiply operations would be required to access any address.

The use of a multidimensional array instead of a tree-like linked list also has some disadvantages in an online adaptive system. In this case, the compiler may not be depended upon to generate the address because the number of membership elements for a category might change over time (most compilers require the array size to be known in advance). When the number of membership elements is changed, the whole array needs to be shifted (probably at multiple points) to make room for the new inserted partition link lists. Similar data movement would be required if the number of membership elements decreases.

Thus, the use of tree-like linked lists provides the advantages of quicker access time (because there is not need to perform all of the multiply operations to generate an address), and greater ease in adding or deleting membership elements in an online adaptive system.

Returning now to the discussion of FIG. 5, the rule identifier 509 passes to the rule processor 515 pointers to those rules in the rule base 519 whose execution will contribute to the desired output variable. The rule processor 515 then executes the subset of rules, using as inputs fuzzy variables obtained from the input fuzzification processor 513. The input fuzzification processor 513 takes each variable in the input vector 503 and converts it into corresponding membership element variables. For example, the input 70 degrees, shown in FIG. 1, would be converted into the fuzzy variables VL=0%, L=0%, M=60%, H=40%, and VH=0%.

The rule processor 515 may be, for example a VY86C500 12-bit fuzzy computational acceleration core, manufactured by VLSI Technology, Inc. of San Jose, Calif., or it may alternatively be a general purpose digital computer programmed to execute rules from a rule base 519. Methods for designing a rule processor 515 for processing fuzzy input variables to produce a fuzzy output variable are well known to those skilled in the art of fuzzy logic, and are not described here in detail.

The output from the rule processor 515 is a fuzzy variable. This fuzzy variable is passed to the defuzzification processor 521 which converts the fuzzy variable into a single numerical (i.e., non-fuzzy) value so that it may be used, for example, in control applications. As explained above, this "defuzzification" may be performed by the well known "centroid method."

The present invention may provide several orders of magnitude increase in execution speed for fuzzy logic rule-based systems, compared with prior art "brute force" systems which require execution of every rule in the rule base in order to produce an output. In addition to the speed advantages over conventional approaches to this problem, the invention is implementable in software as well as special hardware architectures. This allows much larger fuzzy logic rule bases to be constructed on personal computer systems while still allowing reasonable execution speeds.

The invention has been described with reference to a particular embodiment. However, it will be readily apparent to those skilled in the art that it is possible to embody the invention in specific forms other than those of the preferred embodiment described above. This may be done without departing from the spirit of the invention. For example, the invention has been described in the context of a completely specified fuzzy logic rule base and 100% overlap fuzzy envelopes. However, the invention is not limited to these conditions, which are merely set forth for the purpose of simplifying timing discussions. Rather, the invention may be applied to a fuzzy logic system having membership envelopes which overlap by amounts more than or less than 100%. Also, the invention may be applied to any fuzzy logic rule base. This includes rule bases which do not provide complete specification of a system, as well as rule bases containing rules which are in forms other than "IF x= . . . AND y=. . . THEN . . . " That is, the invention is applicable in situations where, for example, rules of the form "IF x= . . . OR y=. . . THEN . . . ," or rules utilizing the fuzzy NOT function are present. In these instances, those skilled in the art will readily be able to determine, while designing the rule partition tree, which subsets of rules contribute to an output and which ones have no effect on an output for any given set of input variable partitions. The fundamental steps of building the rule partition tree during a design phase of the system, and using it during runtime execution to determine which subset of rules should be processed, remain unchanged.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A fuzzy logic system for processing a vector of signals, comprising:

input means for inputting the vector of signals;

an electronic memory having stored therein a rule partition table;

rule identifier means, coupled to the input means and the electronic memory, for using the vector of signals to access a corresponding location in the rule partition table, and retrieving therefrom an identifier of a subset of fuzzy rules that are preselected to be applied to the corresponding vector of signals; and rule processing means, coupled to the input means and to the rule identifier means, for applying each fuzzy rule identified by the retrieved identifier to the vector of signals to produce a processed vector of signals.

2. The fuzzy logic system of claim 1, wherein the rule partition table is a hierarchical linked list having, for each signal of the vector of signals, a corresponding level, each level having, for each partition of signal values of the corresponding signal, a corresponding node having a first link to a neighboring node on the same level and a second link alternatively to a linked list of nodes on a lower level or to an identifier of a subset of fuzzy rules that are preselected to be applied to the corresponding vector of signals, and wherein each partition is, for a corresponding signal, a range of signal values over which predetermined signal category membership envelopes have non-zero values.

3. The fuzzy logic system of claim 2, wherein the rule identifier means uses the vector of signals to traverse the rule partition table to arrive at a base node having a second link to an identifier of a subset of fuzzy rules which are preselected to be applied to the corresponding vector of signals.

4. The fuzzy logic system of claim 3, wherein each identifier of a subset of fuzzy rules identifies only fuzzy rules having a non-zero output when applied to the corresponding vector of signals.

5. The fuzzy logic system of claim 1, wherein the rule partition table is a multi-dimensional array of identifiers, each dimension of the multi-dimensional array corresponding to one signal of the vector of signals and each dimension having a number of identifiers corresponding to a number of partitions of the corresponding signal, wherein each partition is, for a corresponding signal, a range of signal values over which predetermined signal category membership envelopes have non-zero values, whereby for each identifier in the multi-dimensional array there is a corresponding unique combination of partitions of the vector of signals, and wherein each identifier identifies a subset of fuzzy rules which are preselected to be applied to a corresponding vector of signals having signal values within respective ranges of the respective unique combination of partitions corresponding to the identifier.

6. The fuzzy logic system of claim 5, wherein the rule identifier means uses the vector of signals to generate an address for accessing a corresponding identifier in the rule partition cable.

7. The fuzzy logic system of claim 6, wherein each identifier of a subset of fuzzy rules identifies only fuzzy rules having a non-zero output when applied to the corresponding vector of signals.

8. A method for applying fuzzy logic rules to a vector of signals, comprising the steps of:

storing a rule partition table in an electronic memory, the rule partition table including identifiers, each identifier having a corresponding unique combination of partitions of respective signal values of the vector of signals, and each identifying a subset of fuzzy rules that are preselected to be applied to a corresponding vector of signals having signal values within respective ranges of the respective unique combination of partitions corresponding to the identifier, wherein each partition is a range of signal values of a corresponding signal for which predetermined signal category membership envelopes have non-zero values;

inputting the vector of signals;

using the vector of signals to access a corresponding electronic memory location in the rule partition table, and retrieving therefrom a corresponding one of the identifiers; and applying each identified fuzzy rule to the vector of signals to produce a processed vector of signals.

9. The method of claim 8, wherein the rule partition table is a hierarchical linked list having, for each signal of the vector of signals, a corresponding level, each level having, for each partition of signal values of the corresponding signal, a corresponding node having a first link to a neighboring node on the same level and a second link alternatively to a linked list of nodes on a lower level or to an identifier of a subset of fuzzy rules which are preselected to be applied to the corresponding vector of signals, and wherein the step of using the vector of signals to access a corresponding electronic memory location in the rule partition table includes using the vector of signals to traverse the rule partition table to arrive at a base node having a second link to an identifier of a subset of fuzzy rules that are preselected to be applied to the corresponding vector of signals.

10. The method of claim 9, wherein each identifier of a subset of fuzzy rules identifies only fuzzy rules having a non-zero output when applied to the corresponding vector of signals.

11. The method of claim 8, wherein the rule partition table is a multi-dimensional array of identifiers, each dimension of the multi-dimensional array corresponding to one signal of the vector of signals and each dimension having a number of identifiers corresponding to a number of partitions of the corresponding signal, wherein each partition is, for a corresponding signal, a range of signal values over which predetermined signal category membership envelopes have non-zero values, whereby each identifier in the multi-dimensional array corresponds to a unique combination of partitions of the vector of signals, wherein each identifier identifies a subset of fuzzy rules which are preselected to be applied to a corresponding vector of signals having signal values within respective ranges of the partitions corresponding to the identifier, and wherein the step of using the vector of signals to access a corresponding electronic memory location in the rule partition table includes using the vector of signals to generate an address for accessing a corresponding identifier in the rule partition table.

12. The method of claim 11, wherein each identifier of a subset of fuzzy rules identifies only fuzzy rules having a non-zero output when applied to the corresponding vector of signals.

* * * * *